June 18, 1935.   J. R. WINTER   2,005,446
GREASE SEAL
Filed Oct. 20, 1932
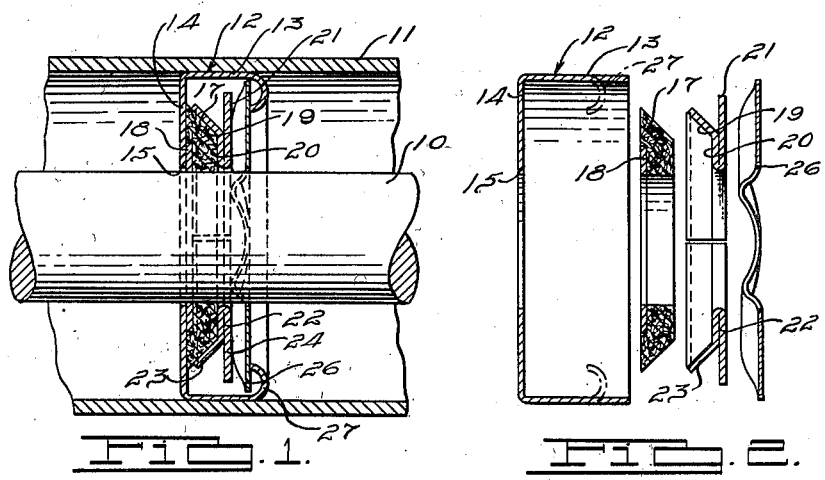
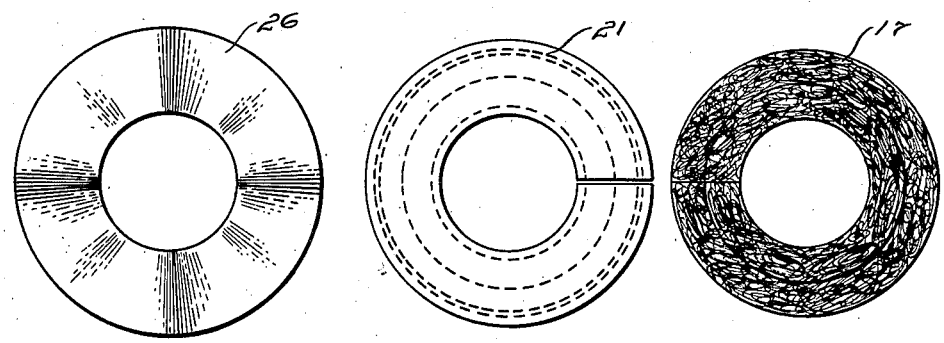
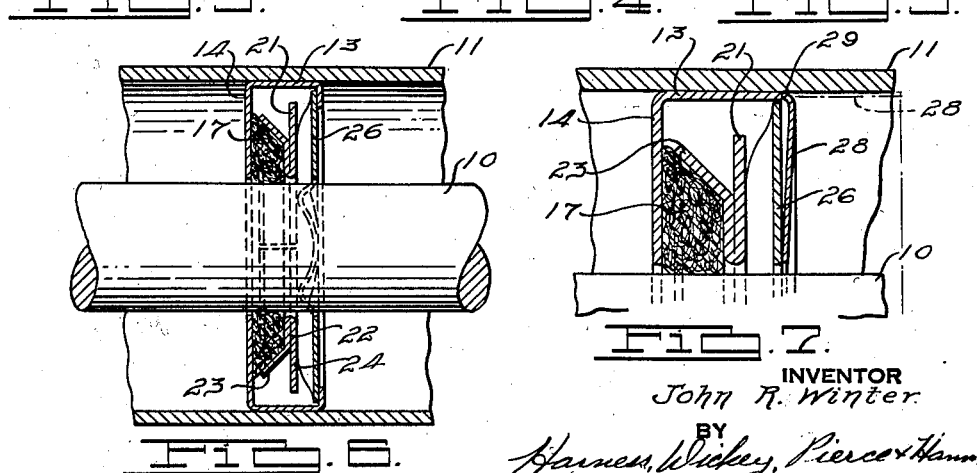
INVENTOR
John R. Winter
BY
Harness, Dickey, Pierce & Hann
ATTORNEYS.

Patented June 18, 1935

2,005,446

UNITED STATES PATENT OFFICE 2,005,446

GREASE SEAL

John R. Winter, Detroit, Mich., assignor of one-half to H. A. Montgomery

Application October 20, 1932, Serial No. 638,802

11 Claims. (Cl. 288—1)

The invention relates to grease or lubricant seals principally for use in connection with rotary shafts and in certain respects constitutes an improvement over the grease seal incorporated in my application for patent, Serial No. 585,300, filed January 7, 1932, now Patent No. 1,961,438.

One object of the invention is to provide an improved grease seal of economical construction, which is not only extremely durable, but extremely efficient for preventing the escape of grease or lubricant along a rotating shaft, throughout a long period of time to the end that the seal need not be replaced often, if at all, and will uniformly maintain its lubricant sealing characteristics.

Another object of the invention is to provide an improved seal of the floating type, which will be durable and uniformly efficient for a long period of time.

Other objects of the invention will become apparent from the following specification relating to particular embodiments of the invention, and from the claims hereinafter set forth.

For a better understanding of the invention reference may be had to the accompanying drawing forming a part of the specification, wherein:

Figure 1 is a fragmentary view of a shaft and housing therefor, illustrating a seal constructed according to one form of the invention;

Fig. 2 is a view in cross section, illustrating the separated parts of the seal, prior to their assembly and prior to insertion of the seal in the housing for the shaft;

Fig. 3 is a side view of a resilient ring, of serpentine formation, which forms a part of the seal;

Fig. 4 is a side view of an annular member forming a part of the seal and which engages one side of the sealing ring;

Fig. 5 is a side view of a sealing ring employed in the seal;

Fig. 6 is a fragmentary view similar to that shown by Fig. 1, and illustrating another form of the invention, and Fig. 7 is a cross-sectional view illustrating a seal having a different form of casing.

Referring to Fig. 1, a rotary shaft is indicated at 10 and a cage or housing therefor is indicated at 11, it being understood that the housing normally will be stationary. For preventing the passage of lubricant or grease between the housing and the shaft, longitudinally of the latter, a sealing device is provided which, as shown by Figs. 1 and 2, comprises a casing 12 having an outer cylindrical wall 13 and a radially directed end wall 14 apertured at its center as indicated at 15. The wall 13 has a press fit with the inner surface of the cage or housing 11, and the opening 15 receives the shaft 10. It will be noted however, that the opening 15 is slightly larger in diameter than the diameter of the shaft so as to permit radial movement of the shaft with respect to the cage or housing which may occur particularly if the shaft should become slightly loose in its bearings, or for any reason have a slightly eccentric movement. A sealing ring 17 is disposed within the casing 13 and in contact with the end wall 14 thereof and the outer surface of the shaft 10 and this ring may be endless in character or it may be split as shown more clearly by Fig. 5. While the ring might be composed of various materials, preferably it is composed of felt or material having similar characteristics, and under certain circumstances it may be found desirable to use materials such as leather, fabric compositions and the like.

A washer 18 is disposed between the end wall 14 of the casing 13 and the sealing ring, and has a rather close fit on the shaft to prevent extension of the felt through opening 15 and along the shaft during any eccentric movement of the shaft although normally the shaft will rotate relative to the washer. Such washer may initially be embedded in the felt or be disposed against the end face of the latter, but in either case the felt outwardly of the washer is resiliently urged into sealing contact with the end wall 14 by a resilient device later to be described. The washer may be constructed of compressed fibrous material or any suitably hard material which will have a small coefficient of friction with respect to the end wall 14, as compared to the coefficient of friction between the felt and such end wall.

The outer surface of the ring 17 is tapered as indicated at 19, and the end wall opposite that wall engaging the casing wall 14, may be directed radially as indicated at 20. For engaging the sealing ring, an annular centrally apertured retaining member 21 is provided which preferably is composed of metal although any other suitable material may be employed. This member, as shown, has an inner folded portion 22, and outwardly diverging flanges 23 and 24 and the flange 23 is axially inclined for engagement with the tapered surface 19 on the sealing ring, while the flange 24 is disposed substantially in a radial plane. The inner periphery of the annular member 21 substantially corresponds in diameter to the diameter of the shaft 10 although such clearance is provided to avoid rotation of the shaft and member together, while the outer diameters of the flanges 23 and 24 are substantially less than that of the casing wall 13 so as to permit floating movement of the ring and felt in a radial plane. It will be noted that the central, folded portion 22 of the annular member engages the radial end wall 20 of the sealing ring.

The annular member may be formed from a strip of sheet metal and then bent into annular form and may be split as thus formed or the ends may be welded. The member might also be formed by a stamping and die forming operation, from a sheet of the metal.

For normally urging the annular member against the sealing ring, an annular metal ring 26 of serpentine formation is provided, which rests against the flange 24 and the central, folded portion 22 of the annular member. This ring 26, in turn, is maintained within the casing 12, by turning an end portion of the wall 13 inwardly as indicated at 27 and into abutting engagement with the side of the ring.

Preferably the outer diameter of the ring 26 may substantially correspond to the inner diameter of the wall 13 as normally radial floating of this ring will not occur, although it should be apparent that it might be of such diameter as to move radially during any radial floating of the shaft, sealing ring 17 and member 21. The inner diameter of the ring preferably is such as to permit radial floating of the shaft without movement of the ring. The ring because of its resilient character, normally will urge the ring 21 against the sealing ring 17, and as a result of the tapering engagement of the flange 23 with the outer tapered surface of the sealing ring, the sealing ring will be urged not only against the end wall 14 of the casing, but radially against the shaft to maintain a positive seal.

The washer being constructed of rather hard material, naturally reduces the friction between the sealing ring and the end wall 14 and facilitates radial floating movement of the ring 17. Furthermore, the close engagement of this fiber ring with the shaft 10 prevents any extrusion of felt through the space between the shaft and the periphery of the opening 15, which would not only act to retard radial floating movement of the sealing ring but serve to pump or squeeze lubricant into the space at the left side of the wall 14, it being assumed that the lubricant ordinarily is at the right side of the seal. In other words, if the washer were not provided, the sealing ring would tend more to compress the felt and pump lubricant through the opening 15 to the left of the wall 14 instead of obtaining the true floating of the sealing ring. It will be apparent of course that the provision of the washer does not prevent engagement of the felt with the end wall 14 outwardly of the washer so as to maintain a sealed engagement with such end wall. In operation, the sealing ring will float radially with any eccentric movement of the shaft, and carry therewith the annular member 21, while maintaining a positive sealing contact with the shaft and end wall 14.

In the construction shown by Fig. 6, the fiber washer is not provided and this arrangement is particularly adapted for use in conjunction with a shaft having constantly true bearings so that the shaft has substantially no movement other than a true rotary movement about a definite axis. In other words in this construction, radial floating of the sealing ring is not so important as little or no eccentric movement of the shaft will ordinarily occur.

In the construction shown by Fig. 7, the wall 13 of casing 12 terminates in a cylindrical portion 28 of reduced thickness, thus providing a shoulder 29. This reduced portion may be formed by a metal drawing or other suitable process, and initially the portion 28 is disposed as shown in broken lines. Now, when the portion 28 is turned inwardly, the shoulder 29 serves as a fulcrum edge and avoids bending of the remaining cylindrical portion to any appreciable extent, thus avoiding deformation of the final cylindrical outer wall of the casing. Moreover, it is easier to turn portion 28 inwardly, although the portion as finally disposed, so reinforces the wall 13 that the casing and seal may be forced into the housing 11 without deforming the casing.

The portion 28 also may serve as a closing end wall of the casing in certain seals, and obviate use of a separate washer frequently used. Such portion may vary in length and may be of such axial length originally, so as to have its inner edge close to the shaft when the portion is turned in, thus providing an end wall similar to wall 14. As shown, the portion is at a slight angle to a radial plane to obtain substantially circumferential line contact with the ring 26, but the portion may be disposed in a radial plane if desired.

Although more than one form of the invention has been illustrated and described in detail, it will be apparent to those skilled in the art that various modifications may be made without departing from the scope of the appended claims.

I claim:

1. In combination, an annular casing having a substantially radial, centrally apertured end wall, a shaft extending through the casing and aperture, the diameter of the aperture being such as to allow radial floating of the shaft in the casing, an annular deformable sealing element extending around the shaft, in engagement therewith and with the end wall of the casing, a friction reducing ring closely fitting the shaft and disposed between the end wall and a portion of the sealing element and being radially movable with the element, an annular member having wedging engagement with the sealing element, and resilient means urging the annular member into engagement with the sealing element.

2. The combination with a casing having an annular substantially cylindrical portion and a substantially radial flange projecting inwardly from one end of the cylindrical portion, of a shaft extending through a central opening in the flange, the opening being larger than the shaft, a deformable sealing ring extending around the shaft in engagement therewith adjacent the flange, a relatively hard washer closely fitting the shaft and abutting the flange, the diameter of said washer being less than the diameter of the sealing ring adjacent the flange, said sealing ring having an outer surface portion tapering away from the flange and toward the shaft, an annular member extending around the shaft and having a tapered portion engaging the tapered surface on the sealing ring, and resilient means cooperating wtih the casing for urging the annular member against the sealing ring, to maintain the latter against the shaft and the flange, outwardly of the washer.

3. The combination with a casing having an annular substantially cylindrical portion and a substantially radial flange projecting inwardly from one end of the cylindrical portion, of a shaft extending through a central opening in the flange, the opening being larger than the shaft, a deformable sealing ring extending around the shaft in engagement therewith adjacent the flange, a relatively hard washer closely fitting the shaft and abutting the flange, the diameter of said washer being less than the diameter of the sealing ring adjacent the flange, said sealing ring having an outer surface portion tapering away from the flange and toward the shaft, an annular member extending around the shaft and having a tapered portion engaging the tapered surface on the sealing ring, and resilient means cooperating with the casing for urging the annular member against the sealing ring, to maintain the latter against the shaft and the flange, outwardly of the washer, said resilient means comprising an annular member having a serpentine formation relative to a radial plane.

4. The combination with a casing having an annular substantially cylindrical portion and a substantially radial flange projecting inwardly from one end of the cylindrical portion, of a shaft extending through a central opening in the flange, the opening being larger than the shaft, a deformable sealing ring extending around the shaft in engagement therewith adjacent the flange, a relatively hard washer closely fitting the shaft and abutting the flange, the diameter of said washer being less than the diameter of the sealing ring adjacent the flange, said sealing ring having an outer surface portion tapering away from the flange and toward the shaft, an annular member extending around the shaft and having a tapered portion engaging the tapered surface on the sealing ring, and resilient means cooperating with the casing for urging the annular member against the sealing ring, to maintain the latter against the shaft and the flange, outwardly of the washer, said annular member having a loose fit on the shaft to permit radial floating thereof with the sealing ring, washer and shaft.

5. The combination with a casing having an annular substantially cylindrical portion and a substantially radial flange projecting inwardly from one end of the cylindrical portion, of a shaft extending through a central opening in the flange, the opening being larger than the shaft, a deformable sealing ring extending around the shaft in engagement therewith adjacent the flange, a relatively hard washer closely fitting the shaft and abutting the flange, the diameter of said washer being less than the diameter of the sealing ring adjacent the flange, said sealing ring having an outer surface portion tapering away from the flange and toward the shaft, an annular member extending around the shaft and having a tapered portion engaging the tapered surface on the sealing ring, and resilient means cooperating with the casing for urging the annular member against the sealing ring, to maintain the latter against the shaft and the flange, outwardly of the washer, said washer reducing the frictional resistance of the flange to radial movement of the sealing ring.

6. The combination with a casing having an annular substantially cylindrical portion and a substantially radial flange projecting inwardly from one end of the cylindrical portion, of a shaft extending through a central opening in the flange, the opening being larger than the shaft, a deformable sealing ring extending around the shaft in engagement therewith adjacent the flange, a relatively hard washer closely fitting the shaft and abutting the flange, the diameter of said washer being less than the diameter of the sealing ring adjacent the flange, said sealing ring having an outer surface portion tapering away from the flange and toward the shaft, an annular member extending around the shaft and having a tapered portion engaging the tapered surface on the sealing ring, and resilient means cooperating with the casing for urging the annular member against the sealing ring, to maintain the latter against the shaft and the flange, outwardly of the washer, said annular member having a substantially radial inner portion engaging a similar end face of the ring inwardly of the taper, from which it follows that the sealing ring is retained between the washer and radial portion of the annular member.

7. The combination with a casing having an annular substantially cylindrical portion and a substantially radial flange projecting inwardly from one end of the cylindrical portion, of a shaft extending through a central opening in the flange, the opening being larger than the shaft, a deformable sealing ring extending around the shaft in engagement therewith adjacent the flange, a relatively hard washer closely fitting the shaft and abutting the flange, the diameter of said washer being less than the diameter of the sealing ring adjacent the flange, said sealing ring having an outer surface portion tapering away from the flange and toward the shaft, an annular member extending around the shaft and having a tapered portion engaging the tapered surface on the sealing ring, and resilient means cooperating with the casing for urging the annular member against the sealing ring, to maintain the latter against the shaft and the flange, outwardly of the washer, said annular member having a loose fit on the shaft to permit radial floating thereof with the sealing ring, washer and shaft, the annular member also having a substantially radial inner portion engaging a similar end face of the ring inwardly of the taper, from which it follows that the sealing ring is retained between the washer and radial portion during floating of the washer, sealing ring, annular member and shaft while maintaining a sealing contact with the flange outwardly of the washer.

8. In a grease seal, a casing having a cylindrical wall portion terminating in a cylindrical portion of reduced thickness, thereby defining a sharp shoulder between the portions of different thicknesses, the thinner portion being bent inwardly toward the cylinder axis about the shoulder junction.

9. In combination, a shaft housing, a shaft in the housing, a shell fitting within the housing and having an end wall apertured to receive the shaft with the aperture larger than the shaft to permit radial floating movement of the latter relative to the shell, a deformable sealing ring in the shell and engaging the shaft, means urging the sealing ring into engagement with the shaft and towards the end wall, and means floatable radially with the shaft and disposed between the sealing ring and wall for preventing extension of the sealing material axially through the aperture and along the shaft, said last mentioned means comprising a relatively hard washer closely fitting the shaft.

10. In combination, a shaft housing, a shaft in the housing, a shell fitting within the housing and having an end wall apertured to receive the shaft with the aperture larger than the shaft to permit radial floating movement of the latter relative to the shell, a deformable sealing ring in the shell and engaging the shaft, means urging the sealing ring into engagement with the shaft and towards the end wall, and means floatable radially with the shaft and disposed between the sealing ring and wall for preventing extension of the sealing material axially through the aperture and along the shaft, said last mentioned means comprising a relatively hard washer closely fitting the shaft and being embedded in the inner portion of the sealing material and allowing the latter to engage the end wall beyond the outer edge of the washer.

11. In a seal, a packing ring of deformable material adapted to encircle and seal against a shaft passing through the same, and a casing for the ring adapted to be press-fitted into a housing about the shaft, said casing consisting of a centrally apertured sheet metal cup having a cylindrical rim which terminates in a portion of substantially uniform thickness bent abruptly in toward the axis of the cup substantially as far as the bottom of the latter to provide an end flange of considerable radial extent, the metal of the cup at the junction of said rim and flange portions being materially thinner than the cylindrical rim portion to facilitate bending of the flange portion without appreciable distortion of the cylindrical portion.

JOHN R. WINTER.